Sept. 12, 1950          J. E. MILLS          2,522,234
WRAPPING MACHINE FOR RAZOR BLADES OR THE LIKE
Filed Nov. 1, 1946          9 Sheets-Sheet 1

Fig. 1

INVENTOR.
John Edwin Mills,
BY George S Richards,
Attorney

Sept. 12, 1950          J. E. MILLS          2,522,234

WRAPPING MACHINE FOR RAZOR BLADES OR THE LIKE

Filed Nov. 1, 1946          9 Sheets-Sheet 3

INVENTOR.
John Edwin Mills,
BY George D. Richards,
Attorney

Sept. 12, 1950     J. E. MILLS     2,522,234
WRAPPING MACHINE FOR RAZOR BLADES OR THE LIKE Filed Nov. 1, 1946     9 Sheets-Sheet 4

INVENTOR.
John Edwin Mills,
BY George D. Richards
Attorney

Sept. 12, 1950 J. E. MILLS 2,522,234
WRAPPING MACHINE FOR RAZOR BLADES OR THE LIKE
Filed Nov. 1, 1946 9 Sheets-Sheet 5

INVENTOR.
John Edwin Mills,
BY
Attorney

Sept. 12, 1950 J. E. MILLS 2,522,234
WRAPPING MACHINE FOR RAZOR BLADES OR THE LIKE
Filed Nov. 1, 1946 9 Sheets-Sheet 8

INVENTOR.
John Edwin Mills,
BY
George D. Richards,
Attorney

Patented Sept. 12, 1950

2,522,234

UNITED STATES PATENT OFFICE 2,522,234

WRAPPING MACHINE FOR RAZOR BLADES OR THE LIKE

John Edwin Mills, East Orange, N. J., assignor to Excel Automatic Products, Inc., Newark, N. J., a corporation of New Jersey Application November 1, 1946, Serial No. 707,288

6 Claims. (Cl. 93—7)

This invention relates to automatic wrapping machinery, and the invention has reference, more particularly, to a novel automatic machine for wrapping flat articles, especially razor blades, in one or more enveloping paper wrappers.

The invention has for its general objects to provide a novel high speed continuous motion wrapping machine having means to draw wrapping paper from a roll and thereupon form therefrom wrapper members having foldable end and side flaps, and then successively present said wrapper members subject to engagement by unwrapped articles or blades, as automatically fed from a supply of the latter, for introduction into a continuously rotating tumbling wheel, whereby to effect first end flap folding of the wrapper members about the articles or blades, and thereupon carry the initially associated articles or blades and wrapper members to positions to be engaged by continuously moving transfer means for removing the associated articles or blades and wrapper members from said tumbling wheel and passing the same subject to operation of last end flap folding and side flap folding means; to further provide, in cooperation with the aforesaid initial wrapper forming and folding mechanisms, a second continuously rotating tumbling wheel together with means for supplying outer wrappers or envelopes having end and side flaps in position to be engaged by the initially wrapped articles or blades as advanced by said transfer means, and thereby entered in said second tumbling wheel for carriage to outer wrapper or envelope folding means, and past means for applying glue to flaps of the outer wrappers or envelopes for sealing said outer wrappers or envelopes, and then subject to discharge by said transfer means from said second tumbling wheel and thence through outer wrapper or envelope folding means to the discharge point of the machine; and to provide, in combination, novel tumbling wheel means having article or blade and wrapper receiving pockets provided with entrance mouths of novel form for cooperation with novel means for entering the articles or blades and wrappers into the receiving pockets during continuous rotary movement of the tumbling wheel means.

The invention has for more specific objects to provide a safety razor blade wrapping machine arranged to so operate that it is impossible for an empty wrapper or envelope to be formed and discharged therefrom, since the wrapping operations are initiated by the blades to be wrapped, and if no blade is fed no wrapper is produced, consequently, from the output of the wrapping machine, when supplied to a cartoning machine, empty wrappers and/or envelopes are eliminated, so that no empty wrapper or envelope detector means is required on the cartoning machine, and the uninterrupted operation of the latter is assured; to provide a wrapping machine whereby the wrappers and/or envelopes are folded close and tightly around the blade ends, thus reducing the paper content of the blade wrappers and/or envelopes to a minimum, and providing a wrapped blade possessed of stiff unyielding ends, whereby to assure more positive and efficient feeding thereof by the feed units of cartoning machines to which the wrapped blades may be subsequently supplied; to provide an improved method of and means for applying sealing glue to blade envelopes, whereby, in the absence of an envelope, no glue can be deposited upon surfaces likely to cause transfer of glue to an exterior surface of a succeeding envelope, with risk of sticking wrapped blades together to the detriment of the operation of feed units of cartoning machines to which the wrapped blades may be subsequently supplied; to provide for cooperation with the wrapper and/or envelope side flap folding mechanisms of the wrapping machine, novel anvil means over which the folds are formed free from engagement with the sharpened edges of the blades; to provide a novel arrangement and location of the initial wrapper forming dies, whereby paper lint and punchings are prevented from entering upon and fouling the working parts of the machine; and to provide means for coordinating and timing the operations of the initial wrapper forming and feeding means, the blade feeding means, the transfer means, glue dauber means and wrapper folding means relative to the continuously rotating tumbling wheel means, so that a minimum of adjustment for average variation of sizes of wrappers and/or envelopes is required.

Other objects of this invention, not at this time more particularly enumerated, will be understood from the following detailed description of the same.

An illustrative embodiment of the invention, as adapted for wrapping safety razor blades, is shown in the accompanying drawings, in which—

Similar characters of reference are employed in the above described views, to indicate corresponding parts.

Referring to the drawings, the chosen embodiment of this invention illustrated thereby is designed for wrapping safety razor blades, but it will be understood that, without essential modification of design or mode of operation, the machine may be readily adapted to wrap other kinds of flat rigid articles.

The various associated mechanisms making up the razor blade wrapping machine are supported by a suitable framework comprising, e. g. a plurality of longitudinal, laterally spaced, upstanding frame plates 21, 22 and 23, which are mounted on leg standards 24.

Supported by a bracket 25 at the rear end of the machine is a roll 26 of paper, such, e. g. as waxed paper, which supplies the material from which inner wrappers for the blades are produced. From said supply roll 26, the web or strip of paper extends around a tensioning roll 27, which is carried by a spring restrained yieldable lever arm 28 that is pivotally supported by said bracket 25. From the tensioning roll 27, the web or strip of paper passes around an over-run control or stop wheel 29 which is rotatably supported by a bearing bracket 30 that is affixed to the frame plate 22. Said over-run stop wheel 29 is subjected to the drag of a spring actuated brake mechanism 31 which is operative upon the hub thereof. From said stop wheel 29, the web or strip of paper is guided by suitably placed and supported guide rollers 32, 33 and 34 for passage to and between intergeared continuously rotated paper feed rollers 35—36, whereby the paper web or strip is withdrawn from the supply roll and then delivered to intermittently operated web or strip advancing means which cooperates with wrapper blanking dies by which the inner wrappers for the blades are formed to provide the same with foldable end and side flap portions. The frictional resistance offered by the brake mechanism to rotation of the control or stop wheel 29 prevents over-run of the paper or web between the same and the feed rollers 35—36, so that the paper or web, as it moves therebetween, is kept free from slack and desirably taut. The supply roll 26 may also be provided with momentum check means adapted to maintain paying off movement of the paper or strip from said supply roll uniform and free from slack; said momentum check means comprising a weighted flexible brake strap 37 arranged to contact the periphery of said supply roll so as to check over-running rotation thereof.

The continuously rotated feed rollers 35—36 and the wrapper blanking die means, together with the intermittently rotated paper web or strip advancing means which advances the web or strip to and through the blanking die means, are mounted between laterally spaced bearing plates 38 which are suspended by hangers 39 from and below the machine frame plates 21 and 22, whereby the blanking die means is located well below the wrapping mechanisms of the machine, so that paper lint and punchings, resulting from the wrapper cutting operations of the blanking die means, are directly discharged downwardly and outwardly from the latter, and well away from said wrapping mechanisms, thus preventing the working parts of said mechanisms from being fouled thereby. This is a very important factor in maintaining operation of the wrapping machine at high speed.

Figure 2:
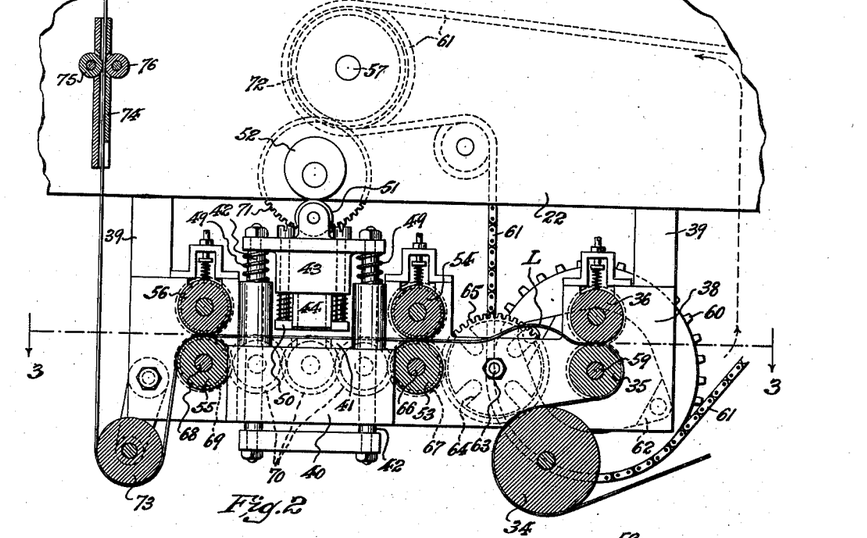
Fig. 2 is a side elevational view in part section of the paper feed and dies operative to form inner wrappers for razor blades to be wrapped, said view being drawn on an enlarged scale.

The blanking die means comprises a die base block 40 which is affixed to and between the bearing plates 38 at a point beyond the location of the continuously rotated paper web or strip feed rollers 35 and 36. Fixed on the top of said base block 40 is a female die plate 41. Supported by slide rods 42, which extend vertically through the die base block 40, is a reciprocable punch head 43 which carries the male or punch dies 44 for cooperation with the die notches 45 of said female die plate 41. Meeting engagement of the male or punch dies 44 with the die notches 45 serves to cut away opposite side marginal portions of the paper web or strip so as to form indenting notches 46 therein. These notches 46 define wrapper side flaps 47, at the same time leaving a longitudinal narrowed portion 48 between said notches 46 which, when later cut through transversely, provide the end flap forming portions of the wrappers. The punch head 43 is yieldably disposed in the normal raised position which separates the male or punch dies 44 from the female die plate and its die notches 45, by compression springs 49 which are interposed between the die base block 40 and said punch head 43, preferably around the slide rods 42. Carried by the punch head 43 is an upwardly yieldable, spring backed stripper plate 50, which strips the paper web or strip from the male or punch dies 44 when the latter are retracted after a wrapper blanking operation. Supported on the top of said punch head 43 is an anti-friction roller 51 adapted to be engaged by a rotated cam 52, which effects suitably timed operative reciprocation of the punch head and male or punch dies 44 for performance of wrapper blanking operations.

Figure 3:
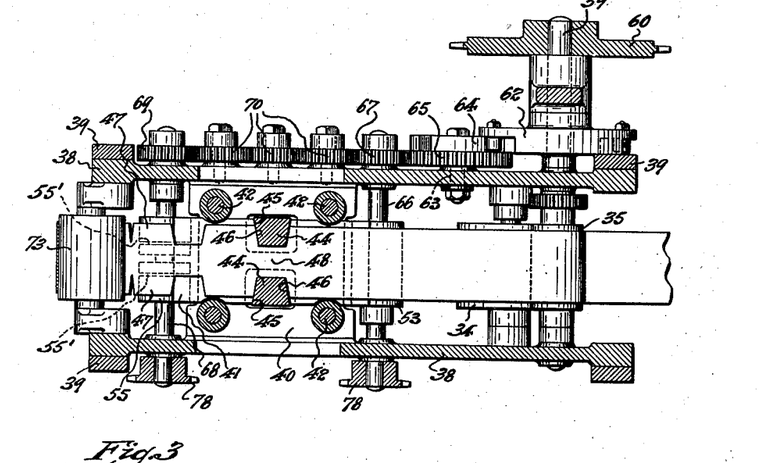
Fig. 3 is a horizontal sectional view of the same, taken on line 3—3 in Fig. 2.
Figure 4:
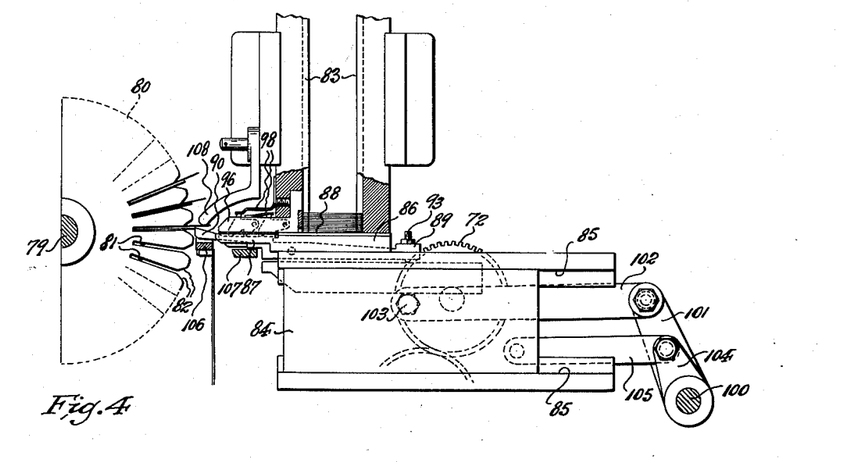
Fig. 4 is an enlarged fragmentary side elevational view in part section showing the means for introducing a blade and inner wrapper therefor into a tumbling wheel of the machine.

Journaled in and between the bearing plates 38, adjacent to the receiving end of the blanking die means, are intergeared paper web or strip advancing rollers 53 and 54, and, similarly, journaled in and between the bearing plates 38, adjacent to the discharge end of the blanking die means are intergeared paper web or strip discharging rollers 55 and 56. One of the rollers, preferably the upper thereof, of the respective pairs of feed rollers 35—36, advancing rollers 53—54, and discharging rollers 55—56 are yieldably pressed toward the cooperating rollers, in manner well known to the art, whereby the paper web or strip is gripped by the pinch of said pairs of rollers so as to be forwardly impelled thereby. Said discharging rollers 55—56 are respectively preferably provided with cooperative male and female scoring means, partially shown at 55' in Fig. 3, operative to score the junctures of the side flaps 47 with the wrapper body from which they extend, whereby to facilitate the in-folding of said side flaps by the wrapping mechanisms to which the same are subjected.

Journaled in and between the machine frame plates 22 and 23, at a suitable location, is the drive shaft 57 of the machine. Said drive shaft 57 is driven by clutch mechanism 58 from a suitable source of power, such, e. g. as an electric motor (not shown). Fixed on the shaft 59 of the lower roller 35 of the continuously rotated paper web or strip feed rollers 35—36 is a sprocket wheel 60 to which the power of the drive shaft 57 is continuously transmitted by a chain and sprocket transmission 61.

Mounted on and driven by said roller shaft 59 is the driving member 62 of a Geneva gearing. Rotatably mounted on a journaling shaft 63, which projects exteriorly from the inner one of the bearing plates 38, is the driven member 64 of said Geneva gearing, and connected with the latter, so as to be rotated thereby, is a drive gear 65. Fixed on the shaft 66 of the lower roller 53 of the paper web or strip advancing rollers 53—54 is a gear 67 which meshes with and is driven by said drive gear 65, whereby to effect operative motion of said advancing rollers 53—54. In like manner, affixed on the shaft 68 of the lower roller 55 of the paper web or strip discharging rollers 55—56 is a gear 69, which is driven from the gear 67 by intermediate idler gearing 70, whereby to effect simultaneous operative motion of said discharging rollers 55—56. It will be observed that, although the paper web or strip feed rollers 35—36 are continuously rotated, by reason of the interposed Geneva gearing, the paper web or strip advancing rollers 53—54 and discharging rollers 55—56 will be intermittently rotated, and consequently the paper web or strip will be intermittently moved through the wrapper blanking die means, in such manner as to permit momentary dwell of the web or strip at the blanking die means while an operative wrapper blanking cut is being performed by the latter. During a period of dwell of the paper web or strip at the blanking die means, said web or strip will continue to be fed forward by the continuously rotated feed rollers 35—36, with the consequence that a loop L will be temporarily formed in said web or strip, which, however, will be immediately taken up or reduced by a succeeding advancing movement of the rollers 53—54 and 55—56. The cam 52 for actuating the wrapper blanking die means is preferably rotated by a driven gear 71, which is mounted on the shaft thereof, and which meshes with and is driven by a drive gear 72 which is mounted on the machine drive shaft 57.

Figure 1:
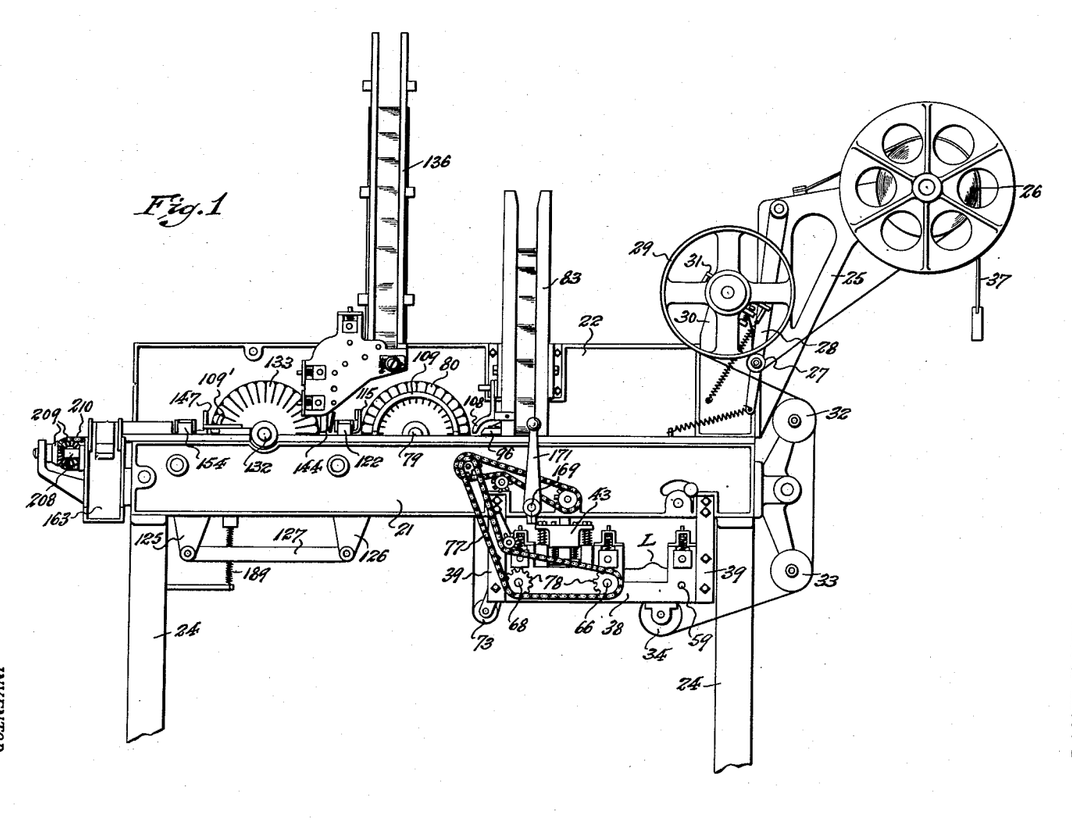
Fig. 1 is a side elevational view of the blade wrapping machine.

The die formed wrapper strip, as issued from the blanking die means by the discharging rollers 55—56, is passed around a guide roller 73 and thence upwardly to intermittently rotated preformed wrapper strip feeding means, by which it is delivered to the razor blade feeding and wrapping mechanisms of the machine. The formed wrapper strip feeding means comprises suitable wrapper strip guide means 74 in connection with which is provided a pair of feed rollers 75 and 76, between which the wrapper strip passes so as to be engaged by the pinch thereof and upwardly impelled by the operative movement thereof. Said wrapper strip feed rollers are intermittently driven in synchronism with the intermittent movements of said web or strip advancing rollers 53—54 and discharging rollers 55—56. An illustrative means for so driving the wrapper strip feed rollers 75—76 comprises a sprocket and chain transmission means 77 which is driven by sprockets 78 respectively mounted on the shafts 66 and 68 of the respective rollers 53 and 55 (see Fig. 1).

Actuated by its shaft 79 is a continuously rotated tumbling wheel, said shaft thereof being journaled in and between the machine frame plates 22 and 23, and said tumbling wheel being fixed on said shaft so as to be disposed intermediate the frame plates 21 and 22. Said tumbling wheel comprises a pair of laterally spaced wheel disks 80, whereby to provide free space therebetween. The overall width of the thus spaced wheel disks 80 substantially conforms to the width of the razor blades to be wrapped, being but slightly in excess thereof. The wheel disks 80 are correspondingly provided, in equi-spaced relation around the circumferences thereof, with a multiplicity of inwardly entering, radial slots 81 adapted to provide receiving pockets within which razor blades and associated wrappers may be successively entered endwise. Each slot 81 is provided at its outer end with a flaring entrance mouth, the same being formed by divergent wall sections 82, which are respectively outwardly inclined at a substantial angle to the planes of the respective wall faces of the slots 81 from which they extend.

Suitably affixed to the exterior face of the machine frame plate 22, rearwardly of the tumbling wheel, is an upstanding blade magazine 83, in which the blades desired to be wrapped may be stacked, so that the same may discharge therefrom by gravity subject to engagement by reciprocated blade delivery means by which they are successively inserted, together with associated wrappers, into the receiving pockets of said tumbling wheel.

Suitably mounted between the machine frame plates 21 and 22, beneath the blade magazine 83 and behind the tumbling wheel 80, is the blade delivery means, the same comprising a reciprocable carriage 84 adapted to be moved toward and from the tumbling wheel 80 in supporting slideway means 85. Fixed on said carriage 84, by their rearward body portions 86, are a pair of laterally spaced, forwardly projecting carrier arms 87, and fixed upon and bridging said body portions 86, rearwardly of said carrier arms 87, is a blade push plate 88. Pivotally mounted between said body portion 86 of the carrier arms is a tiltable auxiliary push bar 89 having a bifurcated forward end portion which extends forwardly between the carrier arms 87 and beyond the extremities thereof, thereby providing a pair of laterally spaced push fingers 90. The tops of the free end portions of said push fingers 90 are upwardly inclined whereby to increase the height of their extremities, thereby providing vertical push faces 91. When said push fingers 90 are positioned for operative engagement with a blade, said push faces 91 extend well above the horizontal plane of movement of the blade as forwardly impelled by the blade delivery means toward and for entrance into a receiving pocket of the tumbling wheel 80. Said auxiliary push bar 89 is yieldably disposed, by a compression spring 92, so as to up-tilt its push fingers 90 to normal blade engaging position. To this end said compression spring 92 is arranged to thrust downwardly upon the tail end portion of said auxiliary push bar 89. Said tail end of the auxiliary push bar is provided with an adjustable stop screw 93, which bears against the carriage 84, whereby to predetermine the normal up-tilted working position of the push fingers 90 and their push faces 91.

Suitably fixed in a stationary position between the blade magazine 83 and the tumbling wheel 80, and in alignment with the blade delivery means, so as to be straddled by the push fingers 90 and carrier arms 87 of the latter when they are advanced, is a cradle bar 94. Said cradle bar 94 is of a length exceeding the length of the blades, and formed in the top edge thereof is a shallow depression 95 of less length than the length of the blades. Affixed to the lower end of the magazine 83, to project forwardly therefrom, in aligned overhanging relation to said cradle bar 94, is a longitudinally slotted bracket 96. Pivotally mounted in said slotted bracket is at least one and preferably two (as shown) detent pawls 97, which are yieldably urged by leaf springs 98 so as to engage nosings 99 thereof with the cradle bar 94 within its depression 95.

Means is provided for producing timed reciprocation of the blade delivery means. An illustrative form of this means (as shown) comprises a rock-shaft 100 which is journaled in and between the machine frame plates 21 and 22. Fixed on this rock-shaft 100 is an actuating lever arm 101, to which is attached one end of a connecting rod 102. The opposite end of said connecting rod 102 is pivotally connected with a crank arm 103 with which the previously mentioned gear wheel 72 on the machine drive shaft 57 is provided, whereby said gear wheel also serves as a continuously rotated crank means for actuating said rock-shaft 100. Also fixed on said rock-shaft is a lever arm 104 to which is attached one end of a connecting rod or link 105, the opposite end of which is pivotally attached to the carriage 84 of the blade delivery means. As will be obvious, oscillation of the rock-shaft 100 will be transmitted by the lever arm 104 and connecting rod or link 105 to the carriage 84, whereby to cause reciprocable back and forth operative movements thereof and of the described blade impelling elements carried thereby.

Suitably arranged adjacent to but spaced below the plane of travel of blades, as delivered from the magazine 83 to the tumbling wheel 80, is a wrapper strip severing or wrapper cut off means which is operative, at proper time, to sever a wrapper from the upwardly fed free end of the wrapper strip, ready to be engaged by an advanced blade. The wrapper strip severing means comprises a stationary knife member 106, which is located adjacent to the periphery of the tumbling wheel 80, and a cooperating movable knife member 107. The movable knife member 107 is actuated by suitable operating and timing means (not shown), the provision and arrangement of which is within the skill of those familiar with the wrapping machine art to produce.

Also affixed to the blade magazine 83, so as to overhang the wrapper strip severing means 106—107 and the cradle bar 94 is a wrapper guard and deflector means 108.

Figure 5:
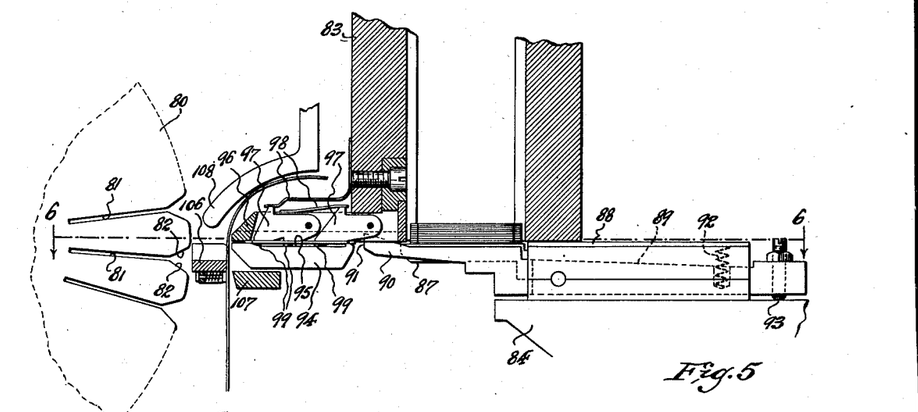
Fig. 5 is a similar view showing initial positions of the blade advancing means, this view being drawn on a further enlarged scale.
Figure 6:
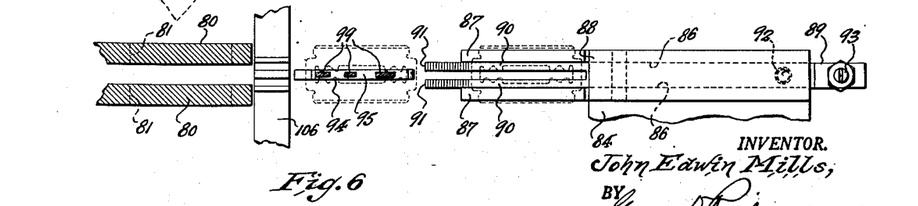
Fig. 6 is a horizontal sectional view, taken on line 6—6 in Fig. 5.

In the operation of the machine, as thus far described, it will be understood that the tumbling wheel 80 is continuously rotated at a predetermined fixed speed by power transmission mechanism hereinafter described. The blade delivery means is in normal retracted position, as shown in Fig. 5, at the moment when a receiving pocket 81 of said tumbling wheel is approaching a position for reception of a blade and associated wrapper. In the meantime, the free end of the wrapper strip has been upwardly advanced to position the leading wrapper section thereof through and beyond the open knife members 106—107, and into engagement with the wrapper guard and deflector means 108. By a previous forward operative stroke of the blade delivery means, a blade has been advanced from the magazine 83 and deposited upon the cradle bar 94, so as to be held thereon against both lateral and rearward longitudinal displacement by the engaging detent pawls 97, the nosings 99 of which are permitted to enter through the blade slot by reason of the depression 95 of said cradle bar, which depression is bridged by the blade as supported upon said cradle bar.

When the blade delivery means is in the stated retracted position, the leading end of the push plate 88 is disposed behind the rear end of the bottom blade of the stack of blades held within the magazine 83, which bottom blade, at this time, rests upon the carriage arms 87. During the approaching travel of a receiving pocket of the continuously rotated tumbling wheel 80 toward alignment with the path of movement of blades as forwardly impelled by the blade delivery means, the blade delivery stroke of the latter begins, whereby the bottom blade of the stack, which is supported by the carrier arms 87, is advanced with the latter by forward movement of the push plate 88, whereby to be deposited, at the end of the blade advancing stroke of said push plate, upon the cradle bar 94, and so as to be engaged and held in place thereon by the detent pawls 97. In the meantime, when the blade feeding stroke of the blade delivery means is initiated, the push faces 91 of the uptilted push fingers 90 engage the rear end of the outer blade which has been previously advanced to and which is supported by the cradle bar 94, so that simultaneously with the forward impulsion of a blade from the magazine stack to said cradle bar, said previously deposited outer blade is pushed forwardly off of the cradle bar by the advancing push fingers 90, the detent pawls 97 readily yielding to the advancing movement of said outer blade.

At or just previous to beginning of advancing movement of the outer blade, the movable knife member 107 is swung toward and into cooperation with the stationary knife member 106, whereby to sever the endmost wrapper section from the wrapper strip. The severed wrapper is supported by the closed knife member 107 until it is engaged by the advancing end of said outer blade, which blade end contacts with the wrapper at the junction of its lower end flap with the body thereof, whereupon the blade and wrapper are advanced together toward the tumbling wheel 80, and so that the lower end flap is folded back upon and beneath the blade, as the blade and wrapper are moved across top portions of the stationary knife member 106.

Figure 7:
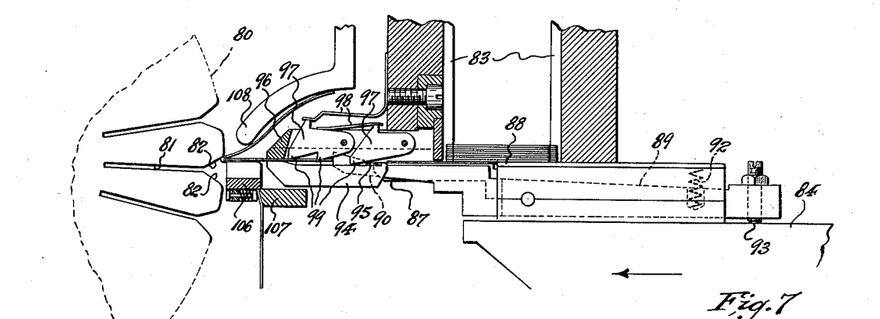
Figs. 7, 8 and 9 are respectively views similar to that of Fig. 5, but showing various stages of the operation of the parts.
Figure 8:
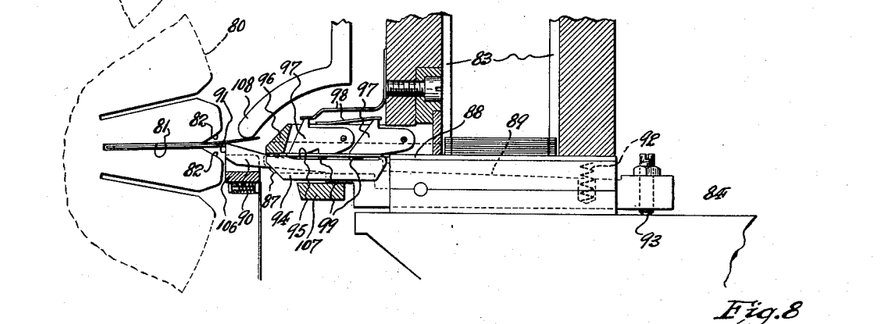

The blade advancing stroke of the blade delivery means is so timed that the leading end of the advanced associated blade and wrapper will reach the periphery of the tumbling wheel 80 at substantially the moment that the outer margin of the leading divergent wall section 82 of the approaching receiving pocket 81 is aligned therewith (see Fig. 7). Thereafter, due to the flaring mouth of the blade receiving pocket, and notwithstanding continuous rotary movement of the tumbling wheel and accompanying inward movement of the associated blade and wrapper, the latter, by following the contour of the pocket mouth, will be permitted to unobstructedly move therethrough and inwardly relative to the tumbling wheel periphery, and thereupon continue to move into the receiving pocket when the latter reaches alignment with the path of blade movement. After said receiving pocket reaches alignment with the path of blade movement, the entering blade and wrapper will partake of the rotary movement of the tumbling wheel, so that the rearward end of the blade will be moved upwardly along the push faces 91 of the push fingers 90, but will remain in contact therewith and subject to continued inward thrust of the latter until inward movement of the blade and wrapper into the receiving pocket of the tumbling wheel is completed, at which time said rear end of the blade will be disengaged from said push faces 91 of the push fingers 90 (see Fig. 8). By reason of this novel construction and combination of blade feeding means and blade receiving pockets of the continuously rotated tumbling wheel, smooth entrance of associated blades and wrappers into the tumbling wheel is assured, without necessity for interrupting the continuous rotary motion of the latter; all of which contributes to high speed operation of the machine with consequent substantial increase of blade wrapping capacity per minute; a sustained wrapping capacity of at least 325 blades per minute having been attained by the machine of this invention.

Figure 9:
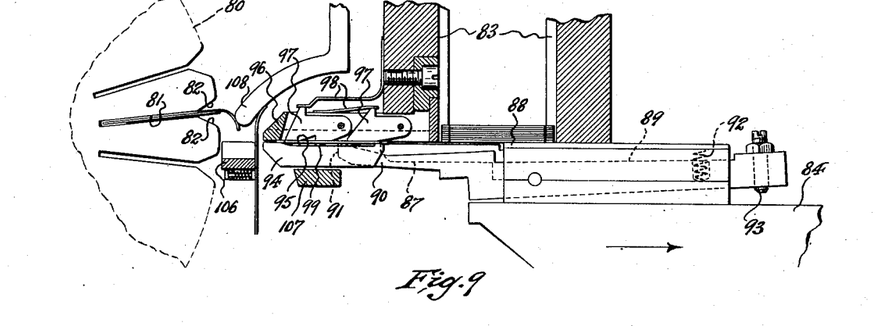

Upon completion of the insertion of a blade and wrapper into a receiving pocket of the tumbling wheel, the blade delivery means is timed to make its retractive stroke back to normal initial position, and for repetition of the described blade and wrapper feeding operations with respect to a next following receiving pocket of the rotated tumbling wheel. When the blade feeding means is so retracted, the uptilted push fingers 90 will yield downwardly, against the tension of the compression spring 92, so as to pass beneath the blade which has been deposited and held upon the cradle bar 94 (see Fig. 9). Upon completion of the retractive stroke of the blade delivery means, said push fingers 90 will be again uptilted by said spring 92, so as to be disposed behind the rear end of the blade held on the cradle bar, ready to advance said blade by the next ensuing operative stroke of the blade feeding means.

The associated blades and wrappers, when entered in the receiving pockets 81 of the tumbling wheel, are so disposed therein that the wrapper side flaps 47 extend exteriorly from the open sides of said pockets, while the trailing wrapper end flaps project from the mouths of said pockets and exteriorly from the periphery of the tumbling wheel. As thus disposed, the associated blades and wrappers are carried forwardly by the rotating tumbling wheel from a horizontal position at the rearward receiving side of the tumbling wheel to a horizontal position at the forward discharge side of the latter, while at the same time the associated blades and wrappers are overturned so that the bodies of the wrappers which, as inserted within the tumbling wheel, overlie the blades will underlie said blades when arriving at the discharge side of the tumbling wheel.

Figure 10:
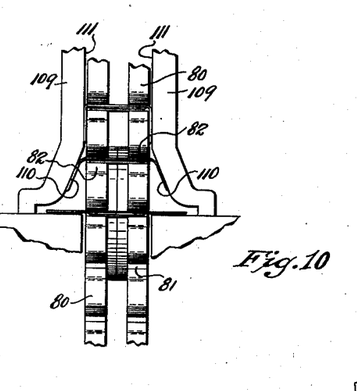
Fig. 10 is a fragmentary enlarged view of the intake side of an inner wrapper and blade tumbling wheel and associated wrapper side flap turning means.

Contiguous to the exterior sides of the upper forwardly moving half of the rotating tumbling wheel 80 are semi-circular wrapper side flap turning guide members 109, which oppose the outwardly open sides of the blade and wrapper carrying pockets 81 of said tumbling wheel. At their rearward ends, which are opposed to the blade and wrapper delivery means, said guide members 109 are provided with downwardly and outwardly inclined wrapper side flap turning sections 110, which are divergent to the perpendicular planes of the tumbling wheel sides, and which lead to and merge with the inner guide faces 111 of said guide members which are parallel to said perpendicular planes of the tumbling wheel sides (see Fig. 10).

As the associated blades and wrappers are entered in the receiving pockets of the tumbling wheel 80, the laterally and horizontally projecting wrapper side flaps 47 will extend beneath the bottom ends of the oblique flap turning sections 110 of the guide members 109, and, as said wrapper side flaps are carried upward by the rotating tumbling wheel, the same will move in engagement with said flap turning sections 110 whereby to be down-turned to planes perpendicular to the blades and bodies of the wrappers, being thereafter retained in the latter position by engagement with the guide faces 111 of the guide members 109 as they are moved forward to the discharge side of the tumbling wheel.

Suitably supported adjacent to the discharge side of the tumbling wheel 80, in horizontal plane in alignment with a receiving pocket 81 of said wheel reaching horizontal discharge position, is a channeled guideway formed by spaced channel forming members 112, the space between which provides a longitudinal through opening 113 adapted to provide a path of movement therethrough for transfer means by which an associated blade and wrapper is discharged from the tumbling wheel and moved through said guideway. Supported to extend transversely between the receiving end of said channeled guideway 112 and the discharge side of said tumbling wheel 80 is a bracket arm 114. Supported by said bracket arm is a last wrapper end flap turning guide means formed by a perpendicular section 115 projecting above the channeled guideway and a forwardly and horizontally extending bifurcate anvil section 116, which extends through the channeled guideway 112 in spaced relation to and above the floor of the latter. The outer side marginal portions of said anvil section 116 are chamfered to provide substantially sharp edges 117, which are spaced away from the side walls of the channeled guideway for a distance somewhat in excess of the thickness of the material of the blade wrappers. Said sharp edges 117 provide means for defining the lines of fold between the wrapper side flaps and bodies, when the former are infolded relative to the latter. The width of said anvil section 116, i. e. the distance between the opposite sharp edges 117 thereof, is somewhat in excess of the width of the blades, so that said edges 117 overhang and protect the sharpened edges of the blades against contact by the wrapper side flaps, when the latter are infolded thereover.

A folding means is provided at each side of the channeled guideway 112 for successively inturning the wrapper side flaps 47 as associated blades and wrappers are moved through said guideway. Said folding means comprises an inner folder member 118 which is movable across the inner side of the guideway 112 and anvil section 116, and an outer folder member 119 which is movable across the outer side of the guideway 112 and anvil section 116. The rearward ends of said folder members 118 and 119 are each shaped to provide inwardly and forwardly inclined oblique wrapper side flap erecting guides 120, which function to dispose said wrapper side flaps in upstanding positions in front of the respective folder members, preparatory to operation of the latter. Said inner folder member 118 is mounted on the upper end of an oscillatable arm 121, and in like manner, the outer folder member 119 is mounted on the upper end of a similar oscillatable arm 122. Timed movements of said oscillatable arms 121 and 122, relative to the passing of an associated blade and wrapper through the guideway 112 and relative to each other, are effected by actuating means to be hereinafter described.

Constantly reciprocated transfer means is provided for discharging the blades and associated wrappers from the receiving pockets 81 of the tumbling wheel 80, and thence past the last wrapper end fold turning guide means 115, and thence through the channeled guideway 112 and beneath the anvil section 116, where subject to wrapper side flap manipulation by the folder members 118 and 119. Said transfer means comprises longitudinally spaced pivoted carrier arms 123 and 124, the respective pairs of which depend from the machine frame plates 21 and 22, below the path of travel of blades and associated wrappers through the machine. Pivotally connected to and between the free ends of the carrier arms 123, by the forward parts of their upper ends, are inverted triangular crank levers 125, and, in like manner, pivotally connected to and between the free ends of the carrier arms 124, also by the forward parts of their upper ends, are similar inverted triangular crank levers 126. Pivotally connected to and between the lower ends of said crank levers 125 and 126 is a parallel motion controlling link 127. Pivotally connected to and between the rearward parts of the upper ends of said crank levers 125 and 126 is a transfer member 128. Rigidly connected with the rearward parts of the upper ends of the crank levers 126 is a connecting rod 129, the free end of which is coupled with a continuously rotated crank arm 130 by which operative motion is imparted to the transfer means. Projecting upwardly from the transfer member 128 are a plurality of suitably spaced push fingers 131. The transfer member 128 with its push fingers 131 is so disposed and is of such thickness or width as to operatively move between the spaced discs which constitute the tumbling wheel 80, and through the longitudinal openings 113 of the guideway means 112 and the associated anvil section 116.

Figures 11, 12:
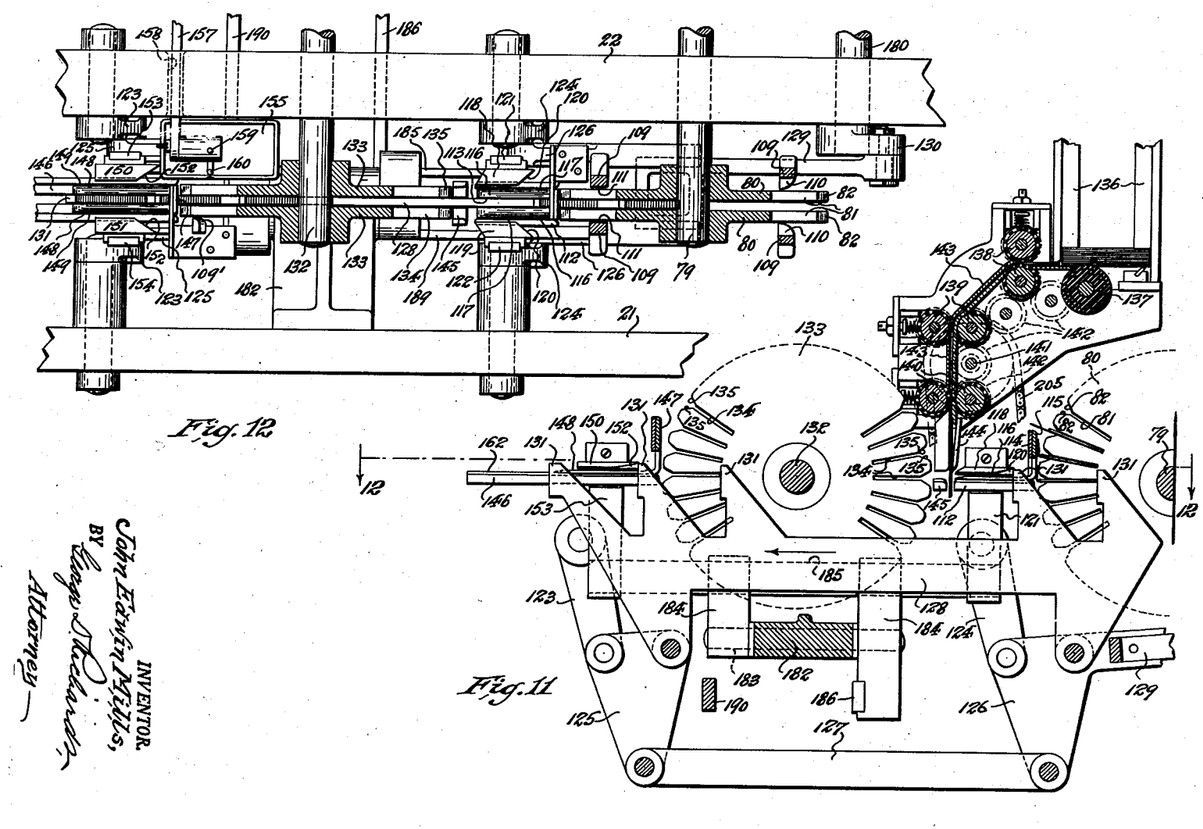
Fig. 11 is a fragmentary longitudinal sectional view of the tumbling wheels and associated wrapper side flap folding means together with means for supplying outer wrappers or envelopes and transfer means for moving the wrapper and blades to and from the tumbling wheels and folding means.
Fig. 12 is a horizontal sectional view taken on line 12—12 in Fig. 11.
Figures 13, 18, 19:
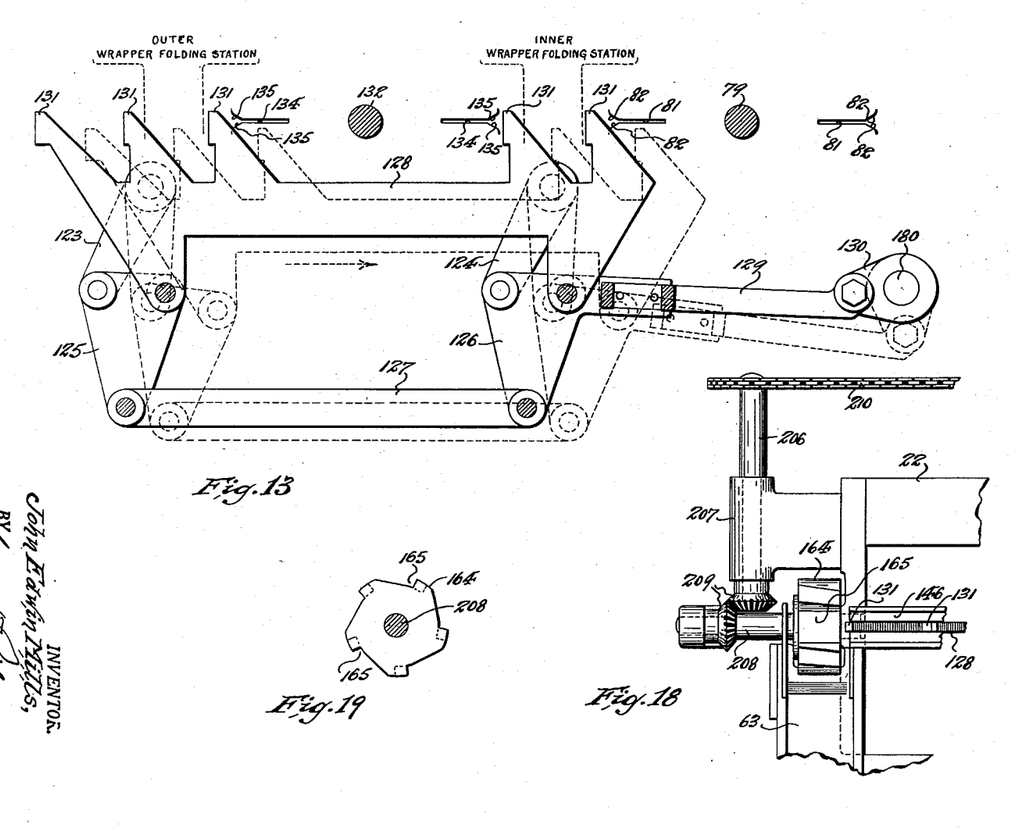
Fig. 13 is a side elevational view in part section of the transfer means showing stages of its motion.
Fig. 18 is a fragmentary plan view of means for discharging wrapped blades from the machine.
Fig. 19 is a side elevational view of the stacking wheel thereof.
Figure 14:
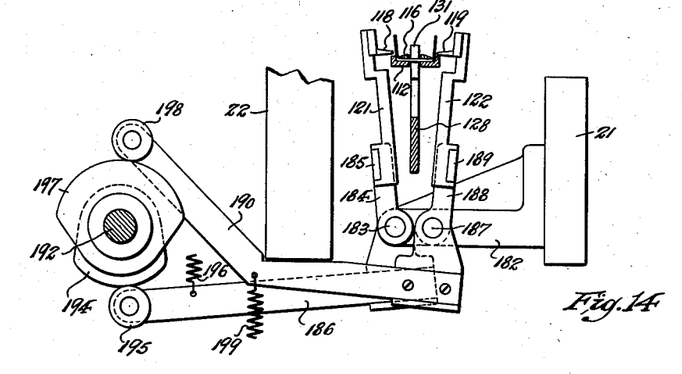
Fig. 14 is a transverse sectional view showing the wrapper side flap folding means of the machine and actuating means therefor.
Figure 15:
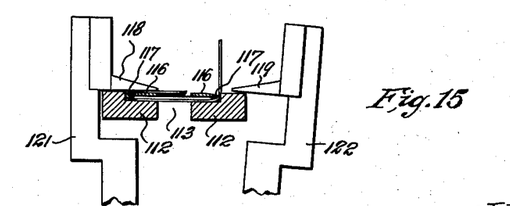
Fig. 15 is a similar fragmentary enlarged view, showing an initial stage of the operations thereof.

Owing to the compound leverage provided by the described pivotally related carrier arms, crank levers and transfer member, when these parts are reciprocated by actuation of the crank arm and connecting rod, the carrier arms will be caused to swing back and forth with accompanying movement of the crank levers about their points of pivotal connection with said carrier arms, whereby to effect a rise and fall of the points of pivotal connection between said crank levers and the transfer member, which rise and fall motion is imparted to the latter. Owing to correlation of the length of the carrier arms, the spacing of the pivotal connections of said crank levers respectively with said carrier arms and with said transfer member, and the throw of crank arm, a reciprocable movement of the transfer member is induced which imparts thereto a substantially level forward stroke while the transfer member is raised to a plane permitting its push fingers to engage and forwardly impel blades and associated wrappers, followed, at the end of said forward stroke, by a downward withdrawal of said transfer member and retraction thereof and of its push fingers in a plane which lowers said push fingers so as to permit them to pass rearwardly beneath the blades and associated wrappers; thereafter to be again raised to engage and forwardly impel following blades and associated wrappers. These operations will be understood from an inspection of Figs. 11 and 13 of the drawings. The means for transmitting power to actuating crank arm 130 will be subsequently described.

In the operation of the machine, a receiving pocket 81 of the tumbling wheel 80, with its contained blade and associated wrapper, is carried by the rotary movement of the wheel to the discharge side thereof, and as said pocket approaches horizontal alignment with the channeled guideway 112, the transfer member 128 is timed to complete its retractive stroke and rise so as to engage its rearmost push finger 131 behind the blade and associated wrapper to be discharged from said pocket. As the blade and associated wrapper passes discharge position, the forward movement of the transfer member 128 is initiated, and by its forward movement the engaging push fingers 131 thereof pushes the blade and associated wrapper out of the tumbling wheel pocket, whereby the last, but now leading, wrapper end flap, which has been upswung to upstanding position by passing engagement with the rear face of said end flap turning guide means 115, is folded over into flat lying position upon the blade body. Upon completion of the forward stroke of the transfer member 128, said push finger has advanced the blade and associated wrapper into the channeled guideway 112 and beneath the anvil section 116, where they dwell while the transfer member is retracted preparatory to a succeeding forward stroke operative upon a succeeding blade and associated wrapper. While the advanced blade and associated wrapper is supported by and dwells in the channeled guideway 112, the folder members 118 and 119 are timed to operate, in such manner that the inner folder member 118 first moves to fold the inner wrapper side flap around the inner sharp anvil section edge 117 and over the anvil section and blade, whereafter the outer folder member 119 is actuated to fold the outer wrapper side flap around the opposite sharp anvil section edge 117 and over the anvil section and blade into overlapping relation to said inner wrapper side flap, thus completing the wrapper folding operations. On the next ensuing forward stroke of the transfer member 128, a forwardly spaced push-finger thereof engages the wrapped blade and discharges it from the channeled guideway 112, while the rearmost push-finger carries a succeeding blade and associated wrapper out of the tumbling wheel and into said channeled guideway and beneath the anvil section, ready for repetition of the above described wrapper folding operations.

Actuated by its shaft 132 is a second continuously rotated tumbling wheel 133, said shaft thereof being also journaled in and between the machine frame plates 22 and 23. Said second tumbling wheel 133 is of the same construction as that of the previously described tumbling wheel 89, and is provided with similar radially disposed, laterally open receiving pockets 134 having flared entrance mouths formed by divergent wall sections 135. Said second tumbling wheel 133 is positioned adjacent to the discharge end of the channeled guideway 112.

Suitably supported above and behind said second tumbling wheel 133 is a magazine 136 for holding a supply of preformed outer wrappers in which the previously wrapped blades may in turn be wrapped. Said magazine 136 includes means for automaticaly and successively feeding said outer wrappers to the second tumbling wheel to and for entrance into the pockets thereof together with aforesaid previously wrapped blades. For convenience of description, and in order to avoid confusion thereof with said previously described inner wrappers, said outer wrappers are hereinafter referred to as envelopes. Said outer wrappers or envelopes are preformed to each comprise a body having end flaps extending from its opposite ends and side flaps extending from its opposite sides. Said preformed envelopes are arranged in a stack within the magazine 136. The means for successively feeding the envelopes from the bottom of the stack thereof supported within the magazine 136, and so as to make properly timed delivery thereof successively to the second tumbling wheel 133, comprises a rotated discharging roll 137 which is adapted to engage the bottom envelope of the stack, and a series of suitably positioned and spaced pairs of intergeared feed rolls 138, 139 and 140. Said rolls are driven from a drive shaft 141 by suitably interposed transmission gearing 142. The means for transmitting operating power to said drive shaft 141 will be later herein described. Envelope guide means 143 is arranged for cooperation with said feed rolls along the path of movement of the envelopes as impelled by the latter. Said guide means terminates in means 144 suitably constructed and arranged to hold the ultimately delivered envelope in position to be operatively engaged by an advanced wrapped blade. The envelope feeding arrangement is such and is so timed that an envelope is delivered and positioned intermediate the discharge end of the channeled guideway 112 and the periphery of the second tumbling wheel 133 just before a wrapped blade is discharged from said channeled guideway by the transfer member 128. Suitably supported and disposed in front of a delivered envelope, and intermediate the same and the periphery of said second tumbling wheel 133, is a stationary envelope end flap folding bar 145.

Located for extension from the discharge side of the second tumbling wheel 133 is a channeled discharge guideway 146 similar in construction to that of the previously described channeled guideway 112. Associated with the receiving end portion of said discharge guideway 146 is a stationary upstanding end flap turning guide member 147, from the lower end of which extends a bifurcated anvil section 148 arranged to overlie the receiving end portion of said guideway 146. The outer sides of said anvil section 148 are provided with substantially sharp edges 149, which define lines of fold between the envelope side flaps and bodies, when the former are infolded relative to the latter. Envelope side flap folding devices, similar in form and mode of operation to the wrapper side flap folding devices previously described, are located respectively at opposite sides of the receiving end portion of the discharge guideway 146 and its contained anvil section 148. Said envelope side flap folding devices comprise an inner folder member 150 and an outer folder member 151, each provided at their rearward ends with oblique erecting guides 152 for disposing the envelope side flaps in upstanding positions in front of the respective folder members 150 and 151, preparatory to operation of the latter. Said inner folder member 150 is mounted on the upper end of an oscillatable arm 153, and, in like manner, said outer folder member is mounted on a similar oscillatable arm 154. Timed operation of said arms 153 and 154 is effected by common actuating means hereinafter described, simultaneously with the operations of the arms 121 and 122 of the wrapper side flap folder members 118 and 119.

Mounted adjacent to the outer face of the second tumbling wheel 133, at the discharge side thereof, is means 109' for upturning the outer side flaps of the envelope to a position perpendicular to the envelope bodies, as said envelopes and associated wrapped blades are carried to the point of discharge from said second tumbling wheel for entrance into the discharge guideway 146.

Figure 16:
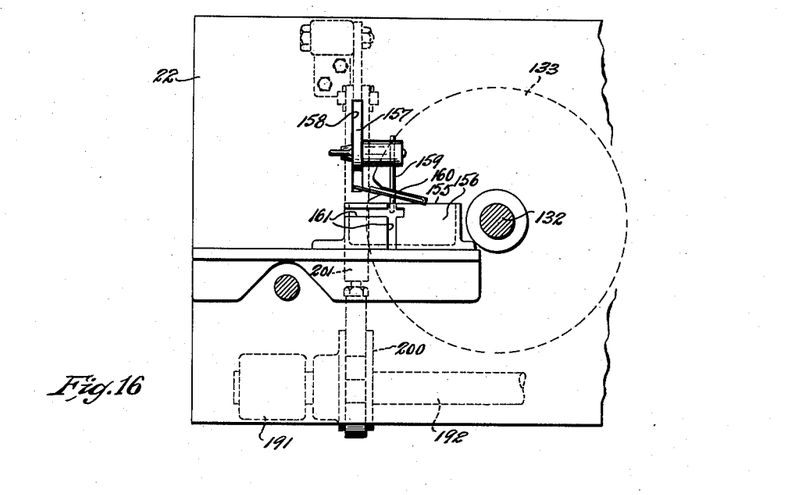
Fig. 16 is a side elevational view of glue dauber mechanism of the machine.
Figure 17:
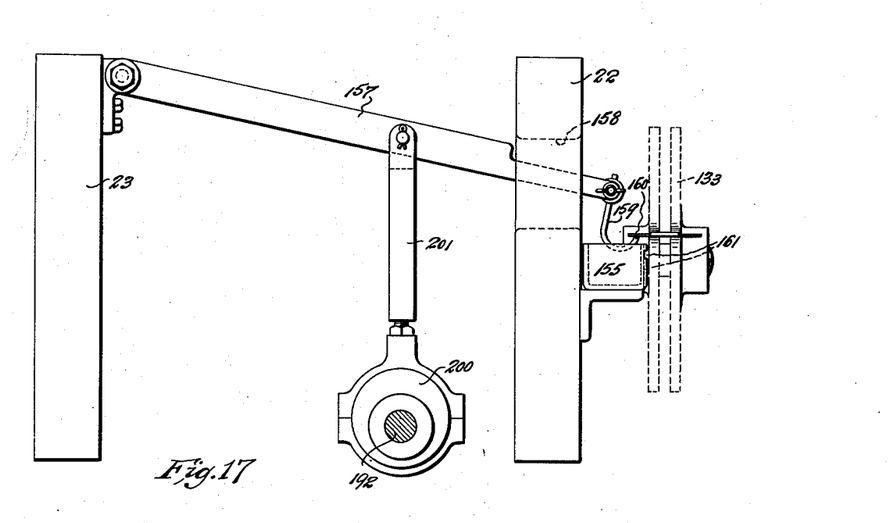
Fig. 17 is another view of the same viewed from the left in Fig. 16.

Positioned adjacent to the inner face of said second tumbling wheel 133, at the discharge side thereof, is means for applying glue to the outer side flaps of the envelopes, preparatory to discharge from said wheel and subsequent infolding thereof. Said glue applying means is also operative to upturn said outer side flaps of the envelopes to positions perpendicular to the envelope bodies. Said glue applying means comprises an upwardly open stationary glue pot 155 which is supported from the machine frame plate 22, so that a wall 156 thereof adjacently opposes the inner face of the second tumbling wheel 133 at the discharge side of the latter. Pivotally fulcrumed on the machine frame plate 23 is a transversely extending, vertically oscillatable lever 157 which extends outwardly through an opening 158 in the machine frame plate 22, whereby to dispose its free end in overhanging relation to the glue pot 155. Suitably coupled with and dependent from the free end of said lever 157 is a glue dauber 159 which is provided with an outwardly and upwardly turned free end portion 160 adapted to provide a glue applicator element. On downswinging movement of the lever 157, the glue dauber 159 is dipped into the glue content of the pot 155. On upswinging movement of the lever 157, the glue dauber 159 is withdrawn from the pot 155, and its glue applicator element 160, which has picked up glue from the pot, is carried upwardly against the downwardly directed outer face of an envelope inner side flap, which is being moved by the tumbling wheel 133 toward the point of discharge therefrom, whereby to apply a spot of glue to the exterior surface of said envelope side flap (see Figs. 16 and 17). After such glue application is made, the dauber 159 is immediately again lowered into the glue, ready for a repetition of the operations. As the rotating tumbling wheel 133 thereafter carries the envelope toward the point of discharge from said wheel, the glue spotted side flap will be engaged by the wall 156 of the glue pot 155, so as to be upturned thereby from horizontal glue receiving position to a position perpendicular to the envelope body, and thus ready for discharge from the wheel and into the discharge guideway 146. In order to prevent smearing or undue spreading of glue on the envelope side flap to which it is applied, and also to prevent contact of the glue with and undesired accumulation thereof upon the glue pot wall 156, the face of the latter is provided with depressed clearance channels 161 (see Fig. 16), through which the applied glue spot may undisturbedly move, as said side flap is upturned and thereafter traverses said glue pot wall 156. The means for transmitting operating power to the oscillatable lever 157 of the glue dauber 159 will be hereinafter described.

To further describe the operation of the machine, as a receiving pocket 134 of the second tumbling wheel 133, at the receiving side of the latter, approaches position to receive a wrapped blade issuing from the channeled guideway 112, an envelope is delivered from the magazine 136 so as to be positioned ready to be engaged by the advanced wrapped blade. In properly timed sequence, a push finger 131 of the transfer member 128 will be disposed behind the wrapped blade in the channeled guideway 112, whereupon, by a forward operative stroke of said transfer member, a wrapped blade will be discharged from the guideway 112 so as to engage the positioned envelope, whereby to advance the latter therewith to the second tumbling wheel 133. As the wrapped blade and associated envelope are thus advanced, the downwardly extending end flap of said envelope will be moved across the folding bar 145, whereby to infold said end flap against the then underface of the wrapped blade. The continued movement of the engaging push finger 131 of the transfer member 128 will move the wrapped blade and associated envelope through the mouth portion and thence on into a passing receiving pocket 134 of the continuously rotated tumbling wheel 133, substantially in the same manner, as above described, in which a blade and associated wrapper is introduced into the first tumbling wheel 80.

By the rotation of the second tumbling wheel 133, a wrapped blade and associated envelope will be carried forwardly to the discharge side of said wheel, and in the process will be overturned or reversed so that the envelope side flap may be turned upwardly across the side edges of the wrapped blade. Upon reaching the point of discharge from the tumbling wheel 133, a forward push finger 131 of the transfer member 128 will be caused to engage and eject the wrapped blade and associated envelope from said tumbling wheel and into the receiving end portion of the discharge guideway 146; the inner side flap of the envelope having, in the meantime, been spotted with glue, and both envelope side flaps turned to upstanding perpendicular relation to and across the sides of the contained wrapped blade. When ejected by the transfer member 128 from said tumbling wheel 133, the still unfolded end flap of the envelope will be turned and infolded over the contiguous end of the wrapped blade, as said flap is carried in passing engagement with the flap turning guide member 147. After deposit in the receiving end portion of the channeled discharge guideway 146, and while the transfer member 128 is making a retractive or recovering stroke, the folder members 150 and 151 are timed to operate, so that the inner folder member 150 first moves to infold the inner side flap of the envelope with its glue spotted face upward, whereafter the outer folder member 151 is actuated to infold the outer side flap of the envelope into overlapping relation to said inner side flap, and in contact with the glue thereon, whereby said outer side flap is adherently secured to said inner side flap. In this manner, the wrapping of an outer wrapper or envelope about a previously wrapped blade is completed, so that the assembly is ready for discharge from the machine.

The envelope enclosed wrapped blades are moved onward and outward through the discharge guideway 146 by additional forwardly spaced push fingers 131 with which the transfer member 128 is provided. The outer end portion of the guideway 146 is preferably provided with a cover plate 162, beneath which the adhered side flaps of the envelopes may pass so as to be held together while the glue sets.

The envelope enclosed wrapped blades may be collected as discharged from the outer end of the discharge guideway 146 in any suitable manner and by any suitable means. Preferably, however, an outgoing collecting chute 163 is provided to extend right angularly from the discharge end of the guideway 146. Located in the receiving end of said collecting chute 163, so as to receive the enveloped wrapped blades from said guideway 146, is a continuously rotated upsetting roll 164 having peripheral pockets 165 to successively receive the discharged enveloped wrapped blades. By the operation of said upsetting roll 164, the received enveloped wrapped blades are upset sidewise from a horizontal position to an upstanding position in which they are deposited by said roll in the collecting chute 163, so as to progressively accumulate therein to form a stack thereof. The thus accumulated and stacked enveloped wrapped blades may be removed at will from the collecting chute for cartoning or other packing operations.

Figure 20:
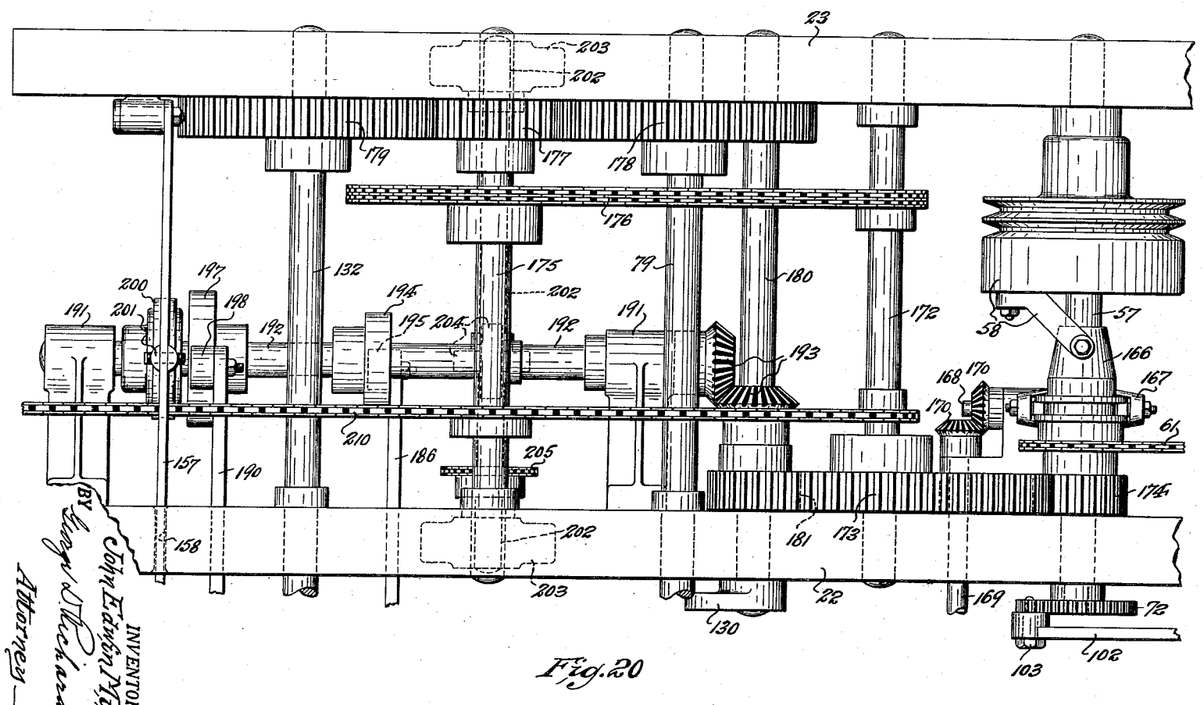
Fig. 20 is a plan view of various coordinated means for transmitting actuating power to the several mechanisms of the machine.

The various mechanisms for transmitting power to the moving parts of the machine, whereby to relatively time and correlate the movements thereof, is subject, as will be obvious to those skilled in the art to which this invention relates, to more or less variation in arrangement and kind, but, for purpose of illustration, forms and arrangements of power transmission mechanisms found to be satisfactory are shown, in the main, by Fig. 20 of the drawings.

As hereinbefore stated, the machine is provided with a power driven shaft 57 which is equipped with clutch mechanism 58. Slidable on the power shaft 57 is a clutch actuating cone 166, cooperative with which is a shift yoke 167. Said shift yoke is affixed to and operated by a suitably supported rock-shaft 168. Said rock shaft is in turn actuated by an operating shaft 169 which is geared to the former by intermediate bevel gearing 170. Said operating shaft 168 extends to and outwardly from the front of the machine, its exterior end being furnished with a hand lever 171 (see Fig. 1) by which it is manipulatable for throwing in and out the clutch mechanism 58 at will.

The transmission of drive of the power shaft 57 to the inner wrapper paper feed mechanism, to the inner wrapper blanking die mechanism and wrapper strip feed means, as well as to the blade feed mechanism has already been described.

The drive of said power shaft 57 is transmitted to the respective shafts 79 and 132 of the tumbling wheels 80 and 133, so as to continuously rotate the latter, by the following transmission means:

Journaled in and between the machine frame plates 22 and 23, parallel to said power shaft 57, is a countershaft 172, affixed to which is a gear wheel 173 which meshes with and is driven by a drive gear 174 fast on said power shaft 57. Also journaled in and between the machine frame plates 22 and 23, intermediate the shafts 79 and 132 of the tumbling wheels 80 and 133, is a second countershaft 175. Said second countershaft 175 is driven from the countershaft 172 by interconnecting sprocket and chain transmission means 176. Fixed on said second countershaft 175 is a drive gear 177 which meshes with and drives the respective gear wheels 178 and 179 which are fast on the respective tumbling wheel shafts 79 and 132, whereby said tumbling wheels 80 and 133 are simultaneously driven, in counter-clockwise direction as shown, at equal constant speeds.

A third countershaft 180 is journaled in and between the machine frame plates 22 and 23 adjacent to the countershaft 172, and is adapted to be driven by a gear 181 thereon from the gear wheel 173 of said latter countershaft. To the outer end of said third countershaft 180 is affixed the crank arm 130 by which the transfer member 128 is actuated.

The means for actuating the inner folding devices which are operative upon the inner wrapper side flaps and the inner envelope side flaps comprises a bearing bracket 182 which is affixed to and projects inwardly from the machine frame plate 21. Mounted in said bearing bracket 182 is an inner rock shaft 183, to the respective ends of which are affixed upwardly extending carrier levers 184. Secured to and across said carrier levers 184 is a longitudinally disposed carrier bar 185, to the respective rearward and forward ends of which are affixed, for upward extension therefrom, the respective oscillatable arms 121 and 153 which support the respective inner folder members 118 and 150. One of said carrier levers terminates at its lower end in a bell-crank portion including an inwardly extending suitably shaped transverse arm 186 by which the inner folding device structure is oscillated by means subsequently referred to. The means for actuating the outer folding devices which are operative upon the outer wrapper side flaps and outer envelope side flaps similarly comprises an outer rock shaft 187, which is also mounted in said bearing bracket 182. To the respective ends of said outer rock shaft 187 are affixed upwardly extending carrier levers 188. Secured to and across said carrier levers 188 is a longitudinally disposed carrier bar 189, to the respective rearward and forward ends of which are affixed, for upward extension therefrom, the respective oscillatable arms 122 and 154 which support the respective outer folder members 119 and 151. One of said carrier levers 188 terminates at its lower end in a bell-crank portion including an inwardly extending suitably shaped transverse arm 190 by which the outer folding device structure is oscillated as subsequently stated. Supported by suitably spaced bearings 191, which are affixed to and which project from the machine frame plate 22, is a longitudinal lay shaft 192, which lies beneath the tumbling wheel shafts 79 and 132 and said second countershaft 175. Said lay shaft 192 is driven from said countershaft 180 by intermeshing bevel gearing 193. Fixed on said lay shaft 192 is a cam 194 for actuating the inner folding device structure, and to this end being engaged by the bell-crank arm 186, through an anti-friction roller 195 which is carried by the free end portion of said bell-crank arm. Said bell-crank arm 186 is retained in operative engagement with said cam 194 by a suitably anchored pull spring 196. In like manner, also fixed on said lay shaft 192 is a cam 197 for actuating the outer folding device structure, which cam 197 is engaged by the bell-crank 190, through an anti-friction roller 198 which is carried by the free end portion of said bell-crank arm 190. Said bell-crank arm 190 is also retained in operative engagement with said cam 197 by a suitably anchored pull spring 199.

The means for operating the glue dauber actuating lever 157 is also driven by the lay shaft 192, and comprises an eccentric 200, the connecting rod 201 of which is pivotally coupled to said lever 157 intermediate the ends of the latter.

The means for transmitting power to the drive shaft 141 of the envelope delivery means comprises a fourth countershaft 202 which is journaled in and between bearings 203 carried by machine frame plates. Said countershaft 202 is driven by intermeshing spiral gears 204 from said lay shaft 192. Said drive shaft 141 of the envelope delivery means is driven from said countershaft 202 by a sprocket and chain transmission 205.

The means for driving the blade discharge stacking and upsetting roll 164 comprises a countershaft 206 which is mounted in a bearing bracket 207 at the machine end. This countershaft 206 drives the shaft 208 of the upsetting roll 164 through intermeshing bevel gearing 209. Said countershaft 206 is driven from the countershaft 172 by a sprocket and chain transmission 210.

It will be understood that the instant invention may be embodied in a machine as above described whereby to enclose razor blades in both an internal wrapper and an outer envelope, or, optionally, in either the wrapper alone or in the envelope alone.

Having now described my invention, I claim:

1. In a machine for wrapping razor blades and the like, a continuously rotated tumbling wheel provided with a series of radial receiving pockets having opposed substantially parallel walls terminating at their outer ends in divergent wall sections oblique to the planes thereof, said wall sections thus providing said pockets with outwardly flared mouths adapted to provide clearance for entering movement of blades and associated wrapping means into said pockets as the latter approach a predetermined loading point plane, and means for advancing blades with associated wrapping means toward the tumbling wheel along a loading point plane radial to said wheel, said advancing means having a blade engaging push face perpendicular to said loading point plane and projecting a substantial distance above the level of said plane, whereby to maintain inthrusting engagement with a blade after the tumbling wheel pocket receiving the blade passes beyond said loading point plane and imparts wheel movement to the blade and until the blade is fully entered in said pocket.

2. A machine for wrapping razor blades and the like as defined in claim 1, wherein said blade advancing means comprises a reciprocated blade carrier means and associated push plate, a magazine for holding a stack of blades so that the bottom blade will engage said carrier means and be advanced therewith from the stack by said push plate, a stationary cradle means to support a blade carried thereto by said carrier means in an advanced position toward said tumbling wheel, detent means for retaining said advanced blade against lateral and rearward displacement from said cradle bar, and a downwardly yieldable push finger means movable with said carrier means, said push finger means having the blade engaging push face at its free end, the free end of said push finger means projecting forwardly beyond said carrier means whereby, upon retraction of the latter, to be disposed to engage said advanced blade for effecting final movement thereof toward and into said tumbling wheel.

3. In a machine for wrapping razor blades and the like: a continuously rotated tumbling wheel and associated wrapper folding means, said tumbling wheel having a series of radial pockets for reception of blades and associated wrappers, said pockets having opposed substantially parallel walls terminating at their outer ends in divergent wall sections oblique to the planes thereof, said wall sections thus providing said pockets with outwardly flared mouths adapted to provide clearance for entering movement of blades and associated wrappers into said pockets as the latter approach a predetermined loading point plane, means for successively advancing blades from a supply thereof along said loading point plane toward the tumbling wheel, said blade advancing means comprising a reciprocated blade carrier means and associated push plate, a magazine for holding a stack of blades so that the bottom blade will engage said carrier means and be advanced therewith from the stack by said push plate, a stationary cradle means to support a blade carried thereto by said carrier means in an advanced position toward said tumbling wheel, detent means for retaining said advanced blade against lateral and rearward displacement from said cradle bar, a downwardly yieldable push finger means movable with said carrier means, the free end of said push finger means projecting forwardly beyond said carrier means whereby, upon retraction of the latter, to be disposed to engage said advanced blade for effecting final movement thereof toward and into said tumbling wheel, said free end of the push finger means having a push face perpendicular to the loading point plane and projecting a substantial distance above the level of said plane, whereby to maintain in-thrusting engagement thereof with a blade after the tumbling wheel pocket receiving the blade passes beyond said loading point plane and imparts movement to the blade and until the blade is fully entered in said pocket, and means to deliver a wrapper blank in the path of and subject to engagement by a blade advanced from said cradle bar whereby to be assembled with said blade and entered therewith into said tumbling wheel.

4. In a machine for wrapping razor blades having: a continuously rotated tumbling wheel provided with a series of laterally open radial pockets to receive blades and associated wrappers as introduced into the wheel at one side thereof and including means to partially fold the wrappers relative to the blades, a channeled guideway to receive and support a blade and associated wrapper as discharged from the opposite side of the wheel with side flaps of the wrapper disposed perpendicular to the blade, means associated with said guideway for folding a projecting end flap around the adjacent blade end as a blade and associated wrapper move from the wheel into said guideway, anvil means extending into said guideway in spaced relation to the bottom and sides thereof and beneath which a blade and associated end flap folded wrapper passes with said wrapper side flaps upstanding therefrom along sides of said anvil means, said anvil means having sharp side edges to define wrapper side flap fold determining lines, successively operated oscillatable folding devices respectively movable across opposite sides of said guideway and anvil, whereby to infold wrapper side flaps around said anvil edges one over the other, and transfer means operative to discharge the blades and associated wrappers from said tumbling wheel to and through said guideway subject to the operation of said folding devices.

5. In a machine for wrapping razor blades and the like as defined in claim 4, wherein said wrapper side flap folding devices comprise an inner folder member extending in a plane above and parallel to the plane of said guideway and anvil means, pivoted lever means by which said inner folder member is moved in and out across the inner side of said guideway and anvil means, a similar outer folder member also extending in a plane above and parallel to the plane of said guideway and anvil means, a second pivoted lever means by which said outer folder member is moved in and out across the outer side of said guideway and anvil means, and rotated cams for respectively actuating said lever means in relatively timed relation so that the inner folder member is moved inward in advance of the outer folder member, whereby to overlap one side flap of a wrapper upon the opposite in-folded side flap.

6. In a machine for wrapping razor blades, a pair of opposed continuously and synchronously rotated tumbling wheels comprising a first wheel and a second wheel, each said wheel being provided with a series of radial receiving pockets having opposed substantially parallel walls terminating at their outer ends in divergent wall sections oblique to the planes thereof, said wall sections thus providing said pockets with outwardly flared mouths adapted to provide clearance for entering and discharging movement of blades and associated wrappers into and from said wheels, means for introducing blades with associated inner wrappers into said first wheel, means cooperative with said first wheel for partially enveloping the blades in inner wrappers while carried by said first wheel, means intermediate said wheels for completing the wrapping of said inner wrappers, means for partially enveloping blades contained in the inner wrappers in outer wrappers while carried by said second wheel, means at the discharge side of said second wheel for completing the wrapping of said outer wrappers, a single propelling means operative to move the blades and associated inner wrappers from the first wheel through said inner wrapper completing means and thence with associated outer wrappers into said second wheel and out of the latter through said outer wrapper completing means, said inner and outer wrapper completing means each comprising a blade and wrapper assembly receiving and supporting guideway, wrapper side flap folding means cooperative with said guideways, said folding means comprising inner folder members respectively extending in a plane above and parallel to the respective guideways, a pivoted lever means common to said inner folder members by which they are moved in and out across the inner sides of said guideways, similar outer folder members also extending in a plane above and parallel to the respective guideways, a second pivoted lever means common to said outer folder members by which they are moved in and out across the outer sides of said guideways, and rotated cams for respectively actuating said respective lever means in relatively timed relation so that the inner folder members are moved inwardly in advance of the outer folder members, whereby to overlap flaps at the outer side of a blade upon previously infolded flaps at the inner side of a blade.

JOHN EDWIN MILLS.

REFERENCES CITED

The following references are of record in the file of this patent:

UNITED STATES PATENTS

| Number | Name | Date |
| --- | --- | --- |
| 1,836,019 | Evans et al. | Dec. 15, 1931 |
| 1,915,550 | Schmitt | June 27, 1933 |
| 2,079,328 | McBean | May 4, 1937 |
| 2,131,428 | Dalkowitz | Sept. 27, 1938 |
| 2,268,474 | Chalmers | Dec. 30, 1941 |
| 2,426,314 | Malhoit | Aug. 26, 1947 |